United States Patent [19]

Bayerle et al.

[11] 4,404,957
[45] Sep. 20, 1983

[54] EQUIPMENT AND PROCESS FOR HEATING WATER BY SOLAR ENERGY

[75] Inventors: Armin Bayerle; Karl-Heinz Holz; Johannes Lüke, all of Frankfurt am Main; Wolfgang Riederer, Hofheim am Taunus, all of Fed. Rep. of Germany

[73] Assignee: Hoechst Aktiengesellschaft, Frankfurt am Main, Fed. Rep. of Germany

[21] Appl. No.: 210,594

[22] Filed: Nov. 26, 1980

[30] Foreign Application Priority Data

Nov. 30, 1979 [DE] Fed. Rep. of Germany ....... 2948207

[51] Int. Cl.³ .................................. F24J 3/02
[52] U.S. Cl. .................... 126/419; 126/422
[58] Field of Search ............... 126/419–423, 126/435, 437, 450

[56] References Cited

U.S. PATENT DOCUMENTS

| 4,182,489 | 1/1980 | Lessieur | 126/422 |
| 4,191,166 | 3/1980 | Saarem | 126/422 |
| 4,196,718 | 4/1980 | Neustein | 126/422 |
| 4,228,785 | 10/1980 | Wagenseller | 126/422 |
| 4,256,089 | 3/1981 | Lewis, Jr. et al. | 126/422 |

FOREIGN PATENT DOCUMENTS

| 283726 | 10/1964 | Australia | 126/419 |
| 909092 | 11/1945 | France | 126/419 |
| 52-47702 | 2/1977 | Japan | 126/422 |
| 54-43339 | 4/1979 | Japan | 126/437 |

Primary Examiner—James C. Yeung
Attorney, Agent, or Firm—Curtis, Morris & Safford

[57] ABSTRACT

The efficiency of equipment for heating process water and containing a solar collector can be substantially improved by connecting a solar collector of low volume but large surface with a reservoir of variable volume in such a manner that fresh water can be fed directly to the collector, but fresh water is not fed to the system in substantial amounts on removal of hot water as long as a certain minimum amount of water is present in the reservoir. Thus, an amount of water corresponding to the charge of the reservoir can be removed from the equipment at a constant temperature.

5 Claims, 1 Drawing Figure

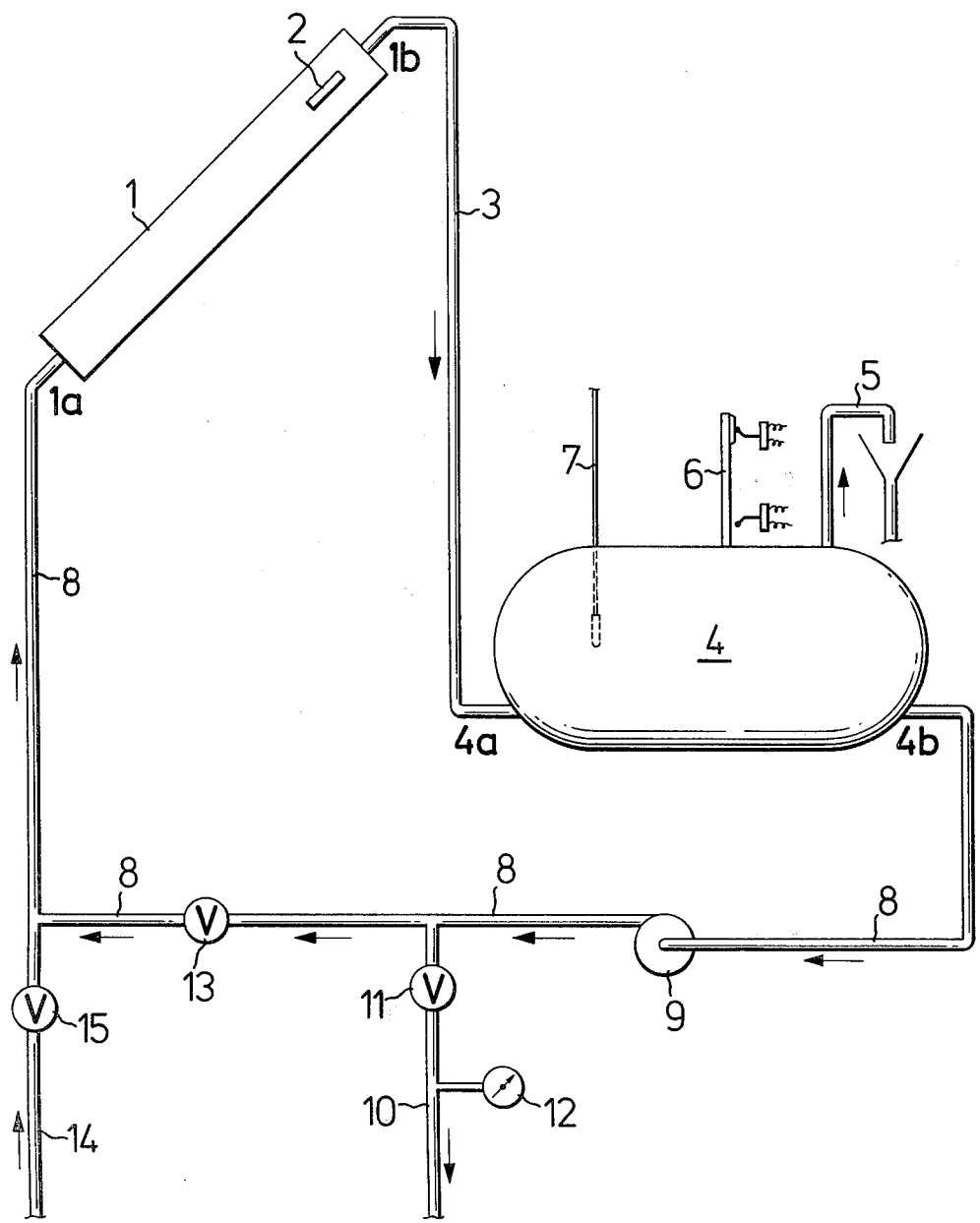

EQUIPMENT AND PROCESS FOR HEATING WATER BY SOLAR ENERGY

Systems for heating water for household and/or industrial use by means of solar energy consisting of a primary and a secondary circuit are known. In a closed primary circuit, the heat generated by the solar collectors from solar radiation is dissipated to a heat transfer fluid, which for its part transmits the heat to the process water in the secondary circuit via a heat exchanger. In the primary circuit, the medium is circulated by gravity or a pump as soon as the collector temperature is several degrees higher than that of the process water. Generally, the secondary circuit contains a reservoir for the heated water which is connected to the drinking water mains, so that its contents are filled up with fresh water at any moment of process water removal.

The disadvantage of these system resides in the use of a heat exchanger, because heat exchange requires in the primary circuit a higher temperature than in the secondary circuit, thus necessitating generally a collector temperature higher by 10° to 15° than that of the process water reservoir. Since the collector efficiency decreases with rising temperature, and simultaneously the loss of heat in the primary circuit increases, a heat exchanger reduces the efficiency of the system. A further disadvantage resides in the fact that the heated process water, on removal of part of it, is mixed with cold fresh water in the reservoir, so that the temperature therein is reduced.

Other systems are known which consist of a single circuit. In these systems, on removal of process water, fresh water is conveyed from a float chamber directly through collectors of large volume which serve simultaneously as reservoir for hot water. The disadvantage of these systems resides in the loss of heat of the storage collectors which occurs any time of low irradiation, such as in the evening, in the night, or even under cloudy conditions.

It has now been found that the efficiency of equipment for heating water which includes a solar collector can be essentially improved by connecting a solar collector of low volume but large surface area with a reservoir of variable volume in such a manner that fresh water can be fed directly to the collector, but fresh water is not fed to the system in substantial amounts on removal of hot water as long as a certain minimum amount of water is present in the reservoir.

Subject of the invention is therefore the equipment as defined in the claims, and the process for heating water by means of solar energy carried out with the use of said equipment.

This system ensures that only water having a defined predetermined temperature is fed to the reservoir (provided that solar irradiation is sufficient). In order to heat it further the water present in the reservoir can be passed repeatedly through the collector; circulation being ensured by a pump which is advantageously fitted in the duct connecting the outlet of the reservoir with the inlet of the collector. When the equipment is designed in such a manner that the reservoir is positioned above the collector, constant circulation of the water without insertion of a corresponding pump is ensured in the case where the temperature of the collector water is higher than that of the water in the reservoir.

The solar collector has a low volume relative to its surface area; the advantage of preventing great losses of heat in periods of low irradiation being the result of this design. The collector is made from corrosion-proof material which is cold-tough and flexible so that no damage occurs on drop in temperature, especially in the case of intense cold and ice formation. Preferably, the collector is made from plastic material, and advantageously, it is provided with a thermocouple by means of which the flow in its interior is controlled.

If desired, several collectors may be series-connected or parallel-connected.

The reservoir is fully closed on all sides in order to protect the water from impurities. It is designed in such a manner that on charge and discharge of water a pressure above or below the static pressure resulting from the corresponding level cannot establish itself; that is, the volume of the reservoir is variable. Preferably, a reservoir is used the outer wall of which consists at least partially of flexible material, for example a coated polyester fabric. When a reservoir having a rigid outer wall is used, a corresponding ventilation has to be ensured. Independently from its design and shape, the reservoir must be provided in any case with an overflow device.

The outlet of the solar collector is connected with the inlet of the reservoir by a tubular duct, as well as the outlet of the reservoir with the inlet of the solar collector, so that collector and reservoir form a closed circuit system. Between the outlet of the reservoir and the inlet of the collector, there are arranged a branch provided with nonreturn valve and leading to a hot water service main, subsequently a stop valve, and, at the inlet of the collector, the fresh water feeder which can likewise be shut by a valve. Advantageously, the branch to the hot water service main is provided with a pressure control device after the nonreturn valve. In the case where the reservoir is arranged in lower position than the collector, a circulating pump is fitted in the tubular duct to the collector inlet at a place between the reservoir outlet and the branch.

The reservoir is provided with a level indicator, which, in the case where the reservoir is practically filled or the level therein decreases below that predetermined as desired, opens the valve mounted in the fresh water feeder duct leading to the collector as soon as the thermocouple in the latter one indicates the collector temperature being the same as or higher than that which has been predetermined. When the reservoir is filled or when the level predetermined as intended is exceeded, the valve in the fresh water feeder duct remains closed. When a preselected minimum level is not attained in the reservoir, this valve is opened by the level indicator, so that there is ensured that any amount of water can be constantly removed at the outlet of the reservoir, even in the case where the temperature in the collector adjusted at the thermocouple cannot be attained because of insufficient solar radiation.

That means: This valve is opened when the temperature in the collector is the same as or higher than the predetermined temperature, and/or when the minimum level in the reservoir is not attained. It is closed when the temperature in the collector is the same as or lower than the predetermined temperature, and/or when the maximum level in the reservoir is attained or exceeded. In all cases, however, control of the valve by the level in the reservoir is given priority over the control by the temperature in the collector.

When the temperature in the collector is higher than the temperature in the reservoir, it is recommended (especially when the reservoir is filled up) to make the water of the reservoir circulate through the collector and thus to attain an elevated temperature in the reservoir. This circulation adjusts itself, as already mentioned, by convection of heat in the case where the reservoir is positioned above the collector, although it is advantageous also in this case to insert a pump in the collector/reservoir/collector circuit in order to ensure an efficient circulation. Use of a circulating pump is however required in the case where circulation of the water in the reservoir cannot be ensured by convection, that is, when the reservoir is positioned below the collector. In this latter case, the reservoir is provided with a thermocouple. At a defined difference between the temperature measured in the reservoir and that measured at the thermocouple of the collector, the circulating pump is switched on provided that the level indicator in the reservoir indicates a defined predetermined level or complete fill.

The invention will be better understood by reference to the accompanying drawing which shows an equipment for heating water according to an especially advantageous and useful embodiment of the invention. However, the invention is not limited to this equipment, and it is not limited to an equipment for heating water, either. By simple and obvious modification, it can be used alternatively for heating other liquids, for example the heating of rooms.

In accordance with the drawing, the outlet (1b) of the solar collector (1) made from plastic material and provided with a thermocouple (2) is connected via the tubular duct (3) with the inlet (4a) of the reservoir (4). This latter one is made from a flexible, coated polyester fabric and provided with an overflow device (5), a level indicator (6) and a thermocouple (7). Another tubular duct (8) ensures connection of the outlet (4b) of the reservoir (4) with the inlet (1a) of the collector (1), so that a circuit system is formed. In this tubular duct (8), there are fitted (as seen from the reservoir (4)): a circulating pump (9), a branch (10) to the hot water service main which contains a nonreturn valve (11) and a pressure control device (12) thereafter, a magnetic stop valve (13), and the fresh water feeder (14) with magnetic stop valve (15). The control equipment which transmits the signals coming from the measuring devices into impulses for starting the circulating pump and for actuating the valves is not shown in the drawing. This kind of control equipment is meant whenever hereinafter control equipment is mentioned.

The reservoir (4) is filled up by opening the magnetic valve (15) when the collector temperature measured by means of the thermocouple (2) is in the range of a temperature T intended for process water of, for example, 42°–45° C. The control equipment regulated by the thermocouple (2) opens the magnetic valve (15), fresh water flows into the collector, and the water present in the collector is conveyed at a temperature T through the tubular duct (3) into the reservoir (4), until the temperature at the thermocouple (2) decreases below the predetermined value, thus causing the magnetic valve (15) to be closed again by the control equipment. On the other hand, the magnetic valve (15) is likewise closed after a predetermined maximum level in the reservoir (4) measured by the level indicator (6) has been attained. The valve (15) remains closed, independently from the temperature at the thermocouple (2), until the level in the reservoir drops below the predetermined level. The reservoir (4) being filled up, as soon as the collector temperature due to solar irradiation is above that of the water in the reservoir and measured by the thermocouple (7), the control equipment opens the magnetic valve (13) and switches on the circulating pump (9), thus causing the contents of the reservoir to be conveyed through the collector (1) and the water to be warmed. When the collector temperature drops below that of the reservoir (4), the control equipment switches off the pump (9) and closes the magnetic valve (13).

On removal of water at the branch (10), the pressure at the pressure control device (12) decreases. The corresponding signal causes the control equipment to close the magnetic valve (13), if open, and to switch on the circulating pump (9), if not already running, so that the pressure of the pump becomes effective in order to increase the pressure of the water in the branch (10).

The valve (11) in the branch (10) prevents reflux of the water being under pressure into the collector circuit.

When such an amount of water is removed via the branch (10) that the level in the reservoir (4) drops below a minimum level, the magnetic valve (15) is opened by the level indicator (6), thus allowing fresh water to be fed from the feeder (14) via the collector (1) to the reservoir (4), and from there to the branch (10) in any amount as desired.

For the case that the solar energy converted in the collector (1) is insufficient for heating the contents of the reservoir (4) to the predetermined temperature, because of insufficient radiation or removal of too large amounts of hot water, it is recommended to care for additional heating in the system. This additional heater (not shown) in the drawing) may be arranged in different places, for example in the reservoir (4), or in parallel position to the collector (1) between ducts (3) and (8), or near the hot water service main. It may be switched on and off by the control equipment via the thermocouple (7).

The device of the invention is free from the disadvantages of the known systems. It does not require a heat exchanger which reduces the efficiency of the known double circuit systems. In the system of the invention collectors can be used the volume of which relative to the absorber surface is low, so that the considerable losses of heat occuring in reservoir collectors of single circuit systems during periods of low solar radiation are prevented. Care has been taken furthermore in the equipment of the invention that cold fresh water is not mixed with the heated water in the reservoir as long as a certain minimum amount of water is present therein, thus ensuring that contrary to the known systems an amount of water corresponding to the charge of the reservoir can be removed at a constant temperature.

What is claimed is:

1. Solar heating apparatus comprising a solar collector having an inlet and an outlet for a liquid; a reservoir having an inlet and an outlet for said liquid; conduit means for circulating the liquid from the collector outlet to the reservoir inlet and from the reservoir outlet to the collector inlet; withdrawal means between the reservoir outlet and collector inlet for withdrawing liquid from the apparatus on demand; injection means independent of said withdrawal means for injecting fresh liquid into the collector; means for sensing a temperature differential between the liquid in the collector and the liquid in the reservoir; and means responsive to the temperature differential sensing means for circulating liquid from the collector to the reservoir and recycling liquid from the reservoir to the collector or injecting fresh liquid into the collector.

2. Apparatus as defined in claim 1 wherein the conduit means for circulating liquid from the reservoir to the collector is provided with a circulating pump intermediate the reservoir and the withdrawal means.

3. Apparatus as defined in claim 1 wherein the reservoir has a variable volume.

4. Apparatus as defined in claim 1 wherein the reservoir has a wall that is at least partially flexible.

5. Apparatus as defined in claim 1 wherein the reservoir is provided with a liquid level sensing means and the injection means is activatable when said level sensing means senses that the liquid level in the reservoir has reached a preselected minimum level.

* * * * *